(12) United States Patent
Abdul et al.

(10) Patent No.: US 10,318,683 B2
(45) Date of Patent: Jun. 11, 2019

(54) CLOCK DOMAIN-INDEPENDENT ABSTRACTS

(71) Applicant: International Business Machines Corporation, Armonk, NY (US)

(72) Inventors: Naiju K. Abdul, Bangalore (IN); Adil Bhanji, Wappingers Falls, NY (US); Jack DiLullo, Austin, TX (US); Kerim Kalafala, Rhinebeck, NY (US); Jeremy J. Leitzen, Kasson, MN (US); Manish Verma, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 169 days.

(21) Appl. No.: 15/160,387

(22) Filed: May 20, 2016

(65) Prior Publication Data

US 2017/0337313 A1    Nov. 23, 2017

(51) Int. Cl.
*G06F 17/50* (2006.01)
(52) U.S. Cl.
CPC ...... *G06F 17/5045* (2013.01); *G06F 17/5031* (2013.01); *G06F 2217/62* (2013.01)
(58) Field of Classification Search
CPC ............ G06F 17/5031; G06F 2217/84; G06F 17/5045; G06F 17/5068; G06F 17/505;
(Continued)

(56) References Cited

U.S. PATENT DOCUMENTS

| 6,782,519 B2 * | 8/2004 | Chang .................. G06F 1/10 716/114 |
| 7,162,706 B2 | 1/2007 | Kuang et al. |

(Continued)

OTHER PUBLICATIONS

Gandhi et al., "Hierarchical Timing Analysis: Pros, Cons, and a New Approach", pp. 1-7, retrieved Apr. 26, 2016, retrieved from the Internet https://www.cadence.com/rl/Resources/white_papers/Hierarchical_Timing_Analysis_WP.pdf.
(Continued)

*Primary Examiner* — Nghia M Doan
(74) *Attorney, Agent, or Firm* — Cantor Colburn LLP; Steven Meyers (57) ABSTRACT

A system and method to generate a clock domain-independent abstract of a component in an integrated circuit design. The method includes performing an initial analysis of the component using an initial clock value for each clock domain type, the clock domain types including a functional clock and a test clock, executing an abstractor to obtain a reduced order model of the initial analysis as a clock domain-dependent abstract, and obtaining original constraints associated with one or more circuit elements within the component from the clock domain-dependent abstract. Generating generalized constraints is based on clock domain-dependent constraints among the original constraints, and generating the clock domain-independent abstract is based on the generalized constraints. The method also includes obtaining a physical implementation based on one or more analyses using the clock domain-independent abstract.

20 Claims, 6 Drawing Sheets

(58) Field of Classification Search
CPC ............. G06F 2217/62; G06F 2217/82; G01R 31/3016; G01R 31/31718
USPC .......................... 716/108, 113, 115, 122, 134
See application file for complete search history.

(56) References Cited

U.S. PATENT DOCUMENTS

| | | |
|---|---|---|
| 7,424,417 B2 | 9/2008 | Guettaf |
| 8,122,404 B2 | 2/2012 | Sinha et al. |
| 2002/0073380 A1 | 6/2002 | Cooke et al. |
| 2003/0065965 A1* | 4/2003 | Korobkov ............ G06F 17/5022 713/500 |
| 2007/0220462 A1 | 9/2007 | Lindberg et al. |
| 2010/0235799 A1* | 9/2010 | Rice .................... G06F 17/5068 716/118 |
| 2013/0159952 A1* | 6/2013 | Niu ..................... G06F 17/5068 716/113 |

OTHER PUBLICATIONS

Kheterpal et al., "IP Exchange Through Handoff for Easy System-On-Chip Design", pp. 1-5, retrieved Apr. 28, 2016, retrieved from the Internet http://www.design-reuse.com/articles/34362/ip-exchange-through-handoff-for-easy-system-on-chip-design.html.

Kumar et al., "Use of Abstraction for Generating Timing Models for Hierarchical Design Closure" pp. 1-4, retrieved Apr. 26, 2016, retrieved from the Internet https://www.academia.edu/5336011/Use_of_Abstraction_for_Generating_Timing_Models_for_Hierarchical_Design_Closure.

Silvaco, "AccuCore STA Introduction Training: AccuCore Static Timing Analysis Commands and Concepts" pp. 1-82, retrieved Apr. 28, 2016, retrieved from the Internet http://www.silvaco.com/content/kbase/accucore_sta_intro_090508.pdf.

Xilinx, "Vivado Design Suite User Guide: Using Contraints" UG903, May 14, 2014, pp. 1-152, retrieved Apr. 26, 2016, retrieved from the Internet http://www.xilinx.com/support/documentation/sw_manuals/xilinx2014_1/ug903-vivado-using-constraints.pdf.

* cited by examiner

CLOCK DOMAIN-INDEPENDENT ABSTRACTS

BACKGROUND

The present invention relates to timing analysis of integrated circuit designs, and more specifically, to clock domain-independent timing abstracts.

The fabrication of an integrated circuit or chip includes several steps to finalize a logic design and analysis and physical implementation. The chip may be designed according to a hierarchical design methodology such that the chip is divided into cores or nests, with each core or nest divided into units that are further divided into macros. The logic design and component placement must result in a physical implementation that meets the requirements for the chip with regard to timing, power, noise, and other aspects. To this end, design analysis (e.g., timing analysis, power analysis, noise analysis) is performed at different hierarchical levels and at different stages of design.

SUMMARY

Exemplary embodiments include a method, system, and computer program product to generate a clock domain-independent abstract of a component in an integrated circuit design. The method includes performing an initial analysis of the component using an initial clock value for each clock domain type, the clock domain types including a functional clock and a test clock; executing an abstractor to obtain a reduced order model of the initial analysis as a clock domain-dependent abstract; obtaining original constraints associated with one or more circuit elements within the component from the clock domain-dependent abstract; generating generalized constraints based on clock domain-dependent constraints among the original constraints; generating the clock domain-independent abstract based on the generalized constraints; and obtaining a physical implementation based on one or more analyses using the clock domain-independent abstract.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

As previously noted, design analysis such as timing analysis, power analysis, and noise analysis is performed to ensure that the physical implementation of a chip design will meet all requirements. For example, static timing analysis (STA) is generally performed to efficiently accomplish timing analysis without simulating the full integrated circuit. In STA, the chip design is represented as a timing graph with nodes indicating points (e.g., circuit elements) in the design where timing information is desired and connections between nodes being represented as arcs. STA is performed at different stages of the design, but analyzing the entire chip design at every stage is inefficient in terms of run-time. Instead, a hierarchical design methodology is used and timing analysis is performed at different hierarchical levels (e.g., core, unit, macro) based on the needs at any given design stage. This hierarchical design methodology may be used for other types of design analysis, as well.

A macro may be a single logic gate or a collection of transistors or gates interconnected with wires and designed to perform a certain task. Detailed analysis may be performed at the macro level. For example, macros may be timed using accurate timing analysis techniques that include transistor level timing tools or gate level timing tools. This type of detailed analysis may be followed by generation of abstract models that represent the relevant characteristic of the macro in a simplified form. For example, a macro timing abstract represents timing characteristics in a simplified form. The generation of abstract models may be referred to as abstraction, performed by an abstractor. At higher levels (e.g., unit level, core level), macros are represented by abstracts for purposes of performing analysis. A unit comprised of several macros, each associated with abstracts, may itself be abstracted. Thus, for purposes of discussing abstracts, macro may generally refer to any component that is abstracted. Because macros are reused in different parts of the chip design at different levels of hierarchy, the same macro may be part of different clock domains.

A prior approach to design analysis involves generating a different abstract for a macro for every clock domain in which the macro is used. For example, a particular macro may be used in a clock domain associated with a fast functional clock and may also be used in another clock domain associated with a slow functional clock. Two abstracts (e.g., two timing abstracts, two power abstracts) would be generated for the same macro, one for each clock domain.

Turning now to an overview of the present disclosure, one or more embodiments relate to generating clock domain-independent abstracts for the macros used in a chip design and, subsequently, generating clock domain-dependent abstracts for use in chip design analysis (e.g., timing analysis, power analysis, noise analysis). According to the embodiments, multiple abstracts need not be generated for a given macro to address multiple clock domains in which the given macro is used. More specifically, one or more embodiments of the systems and methods detailed herein generate an abstract of a macro for a particular clock domain and generalize the constraints to generate a generic abstract of the macro for subsequent instantiation and use in any clock domain.

Figure 1:
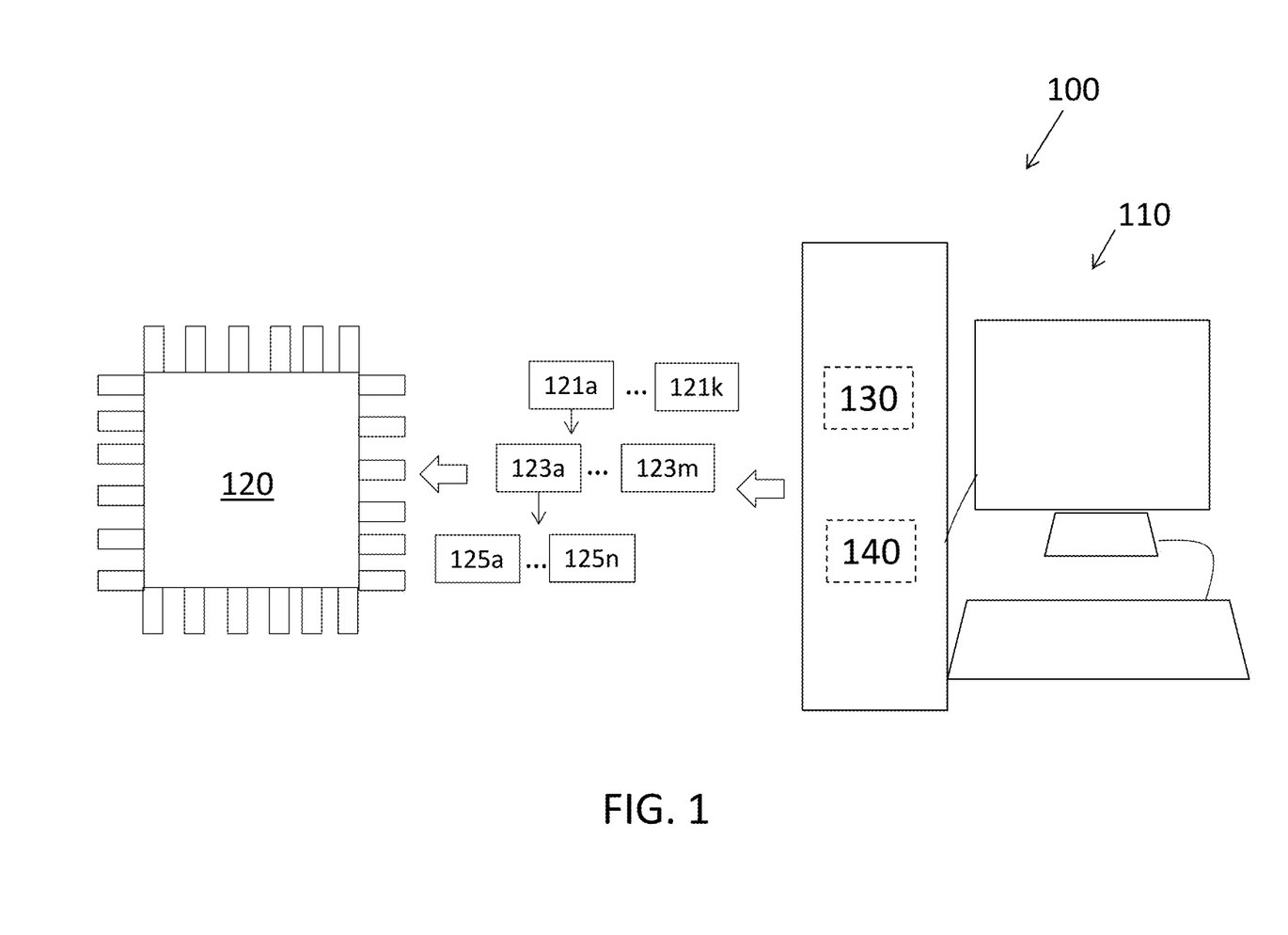
FIG. 1 is a block diagram of a system according to embodiments of the invention.

Turning now to a more detailed description of one or more embodiments, FIG. 1 is a block diagram of a system 100 according to embodiments of the invention. The system 100 includes a processing system 110 used to design an integrated circuit and the resulting physical implementation of the integrated circuit or chip 120. The hierarchical organization of the chip 120 is shown in FIG. 1 as including cores 121, units 123, and macros 125. Exemplary cores 121a through 121k are shown. Core 121a is shown to include units 123a through 123m, and unit 123a is shown to include macros 125a through 125n. Different cores 121 may include different numbers of units 123, and different units 123 may include different numbers of macros 125. The processing system 110 includes one or more memory devices 130 and one or more processors 140. Multiple of the processors 140 may be used in the generation of clock domain-independent abstracts and in the subsequent generation of clock domain-specific abstracts detailed below. The memory device 130 stores instructions implemented by the processor 140. As further discussed, these instructions include processes used to perform the abstract generation. According to the embodiments detailed below, the memory device 130 may additionally store the bucketized information discussed with reference to FIG. 4.

Figure 2:
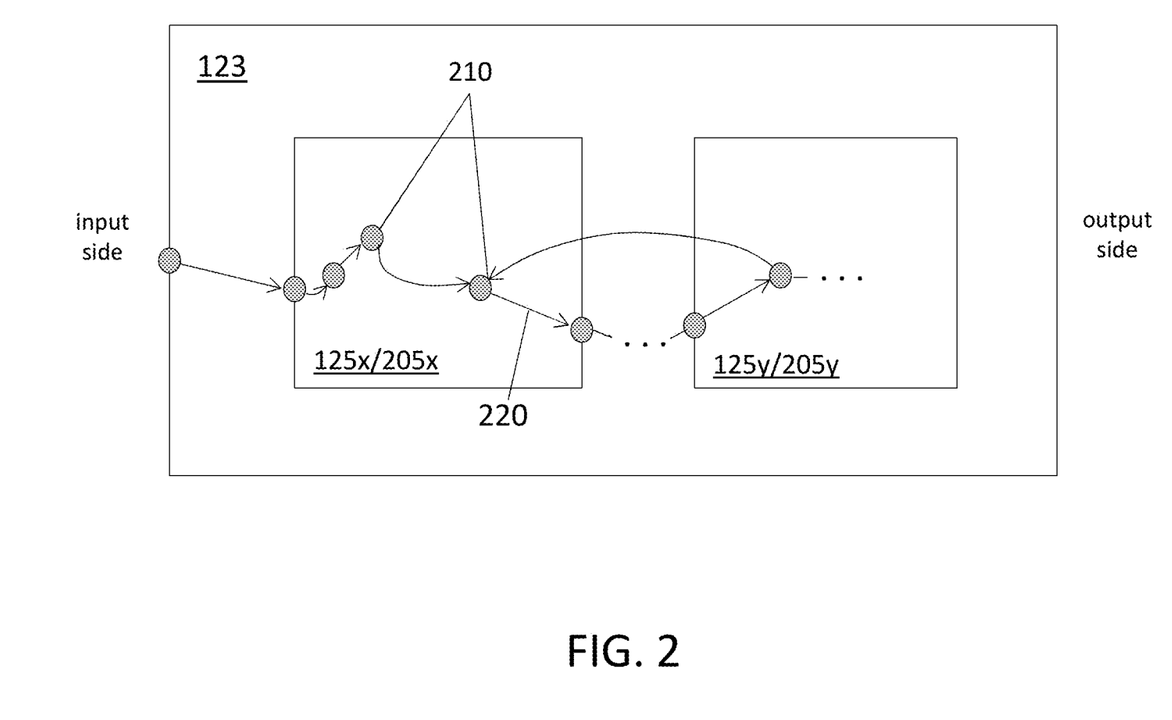
FIG. 2 shows exemplary clock domain-independent timing abstracts for exemplary macros that are generated according to one or more embodiments.

FIG. 2 shows exemplary clock domain-independent timing abstracts 205 for exemplary macros 125 that are generated according to one or more embodiments. Timing abstracts used in timing analysis are discussed herein as a specific example for explanatory purposes. However, the embodiments also relate to other abstracts used in other types of analysis of the chip design (e.g., power analysis, noise analysis). The portion of the hierarchical design shown in FIG. 2 includes a core 123 with two macros 125-x and 125-y. Nodes 210 within the timing abstracts 205x, 205y respectively associated with the macros 125x, 125y are shown, as well as timing arcs 220. One or more nodes 210 may be associated with a timing constraint.

A timing constraint specifies adjusting or delaying the timing signal at the associated node based on the clock frequency, killing undesired clock domains from propagating (e.g., killing functional clocks from propagating through scan paths), and generating or converting the clock to a different clock domain for analysis (e.g., generating scan signals at scan points). According to one or more embodiments of the invention detailed below, the constraints associated with nodes of the timing abstract are generalized to be clock domain-independent.

In alternate embodiments relating to other types of analysis (e.g., noise analysis), constraints associated with other parameters (e.g., noise) may specify adjustments to those parameters. For example, a noise abstract used to perform noise analysis may specify constraints to adjust noise at a given node based on the clock domain. As a specific example, the constraint may specify that noise should be adjusted based on the clock domain type being a functional clock but not when the clock domain type is a scan clock. Bucketizing the clocks and adjustments as described for timing constraints below facilitates generating clock domain-independent abstracts.

Figure 3:
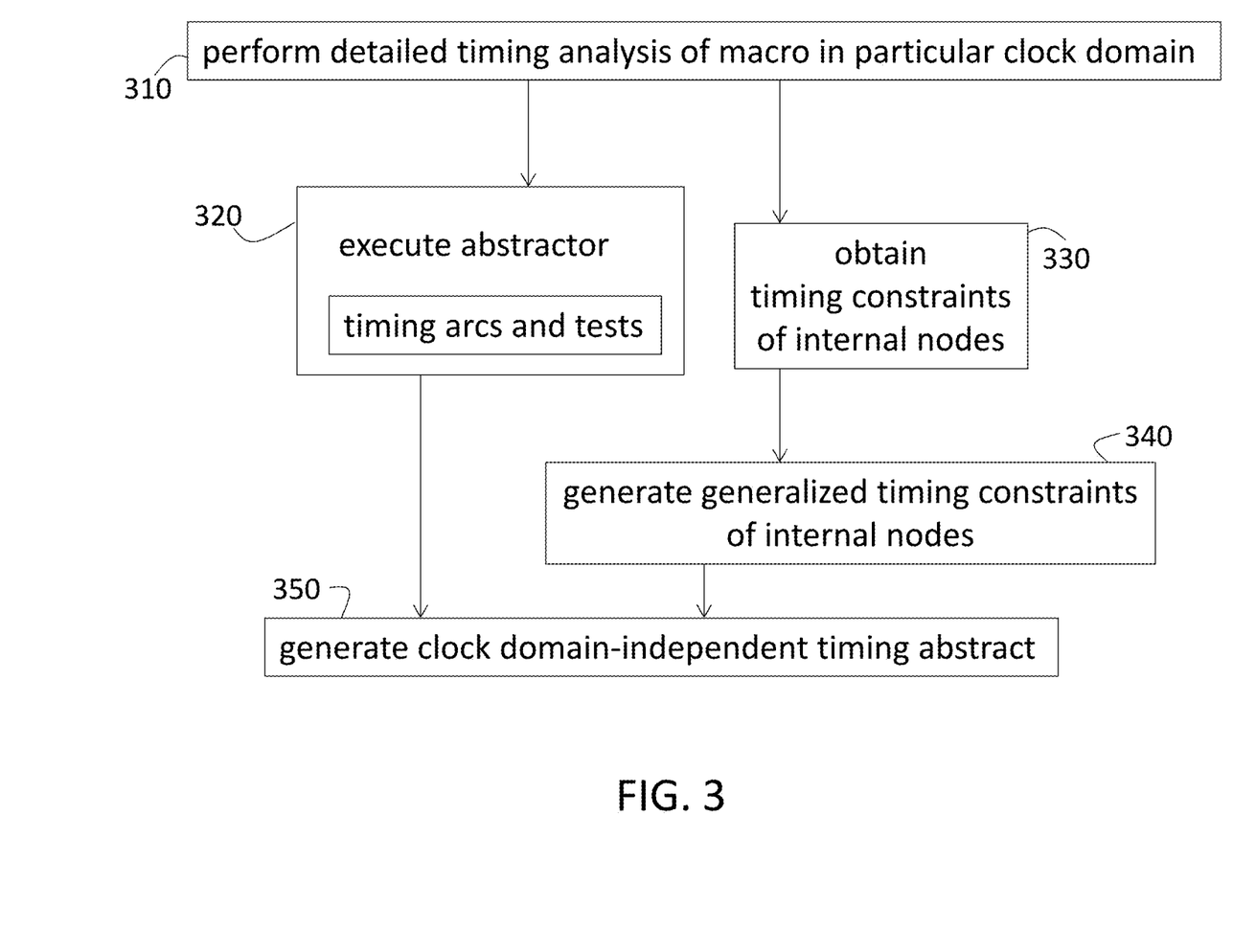
FIG. 3 is a process flow of a method of generating a clock domain-independent timing abstract according to one or more embodiments of the invention.

FIG. 3 is a process flow of a method of generating a clock domain-independent timing abstract according to one or more embodiments of the invention. Again, the processes may apply to generating clock domain-independent versions of other types of abstracts, as well. While the timing abstract 205 of a macro 125 is detailed for explanatory purposes, the abstract 205 may be of a set of macros 125 or, generally, of any component or sub-component of the chip 120, as noted previously. At block 310, the processes include performing detailed timing analysis of a macro 125 with particular clock values for each clock domain. That is, a given timing abstract may be associated with a functional clock and a test clock, for example. An initial value is specified for each of those types of clock domains for the initial timing analysis. For example, the timing run at block 210 may be performed using a fast clock (high frequency value) for the functional clock. By ensuring that the design of the macro 125 meets timing requirements for the fastest clock, the design is also validated for slower clocks. In alternate embodiments, another clock speed may be used in the processing at block 210.

Executing the abstractor, at block 320, involves performing the conventional process of obtaining a clock domain-dependent timing abstract. This process results in timing arcs 320 and tests that are specific to the design of the macro rather than to any particular clock domain. As noted previously and shown in FIG. 3, timing arcs 320 interconnect nodes 210 and represent the timing relationship between any two nodes 210 in the design. The timing abstract 205 represents the transition time information, delay information, and transition direction (rising edge to falling edge, falling edge to rising edge) for each timing arc 220. The timing abstract also includes various known tests between nodes 210 such as the setup test and hold test, for example. Obtaining timing constraints of internal nodes of the macro 125, at block 330, is also part of the conventional processing and involves obtaining timing constraints associated with the clock domain or domains for which detailed timing analysis was performed (at block 210). At block 340, generating generalized timing constraints of internal nodes of the macro 125 is performed as detailed with reference to FIG. 4. The abstractor output (from block 320) and generalized timing constraints (from block 340) are used in generating a clock domain-independent timing abstract 205 of the macro 125 at block 350.

Figure 4:
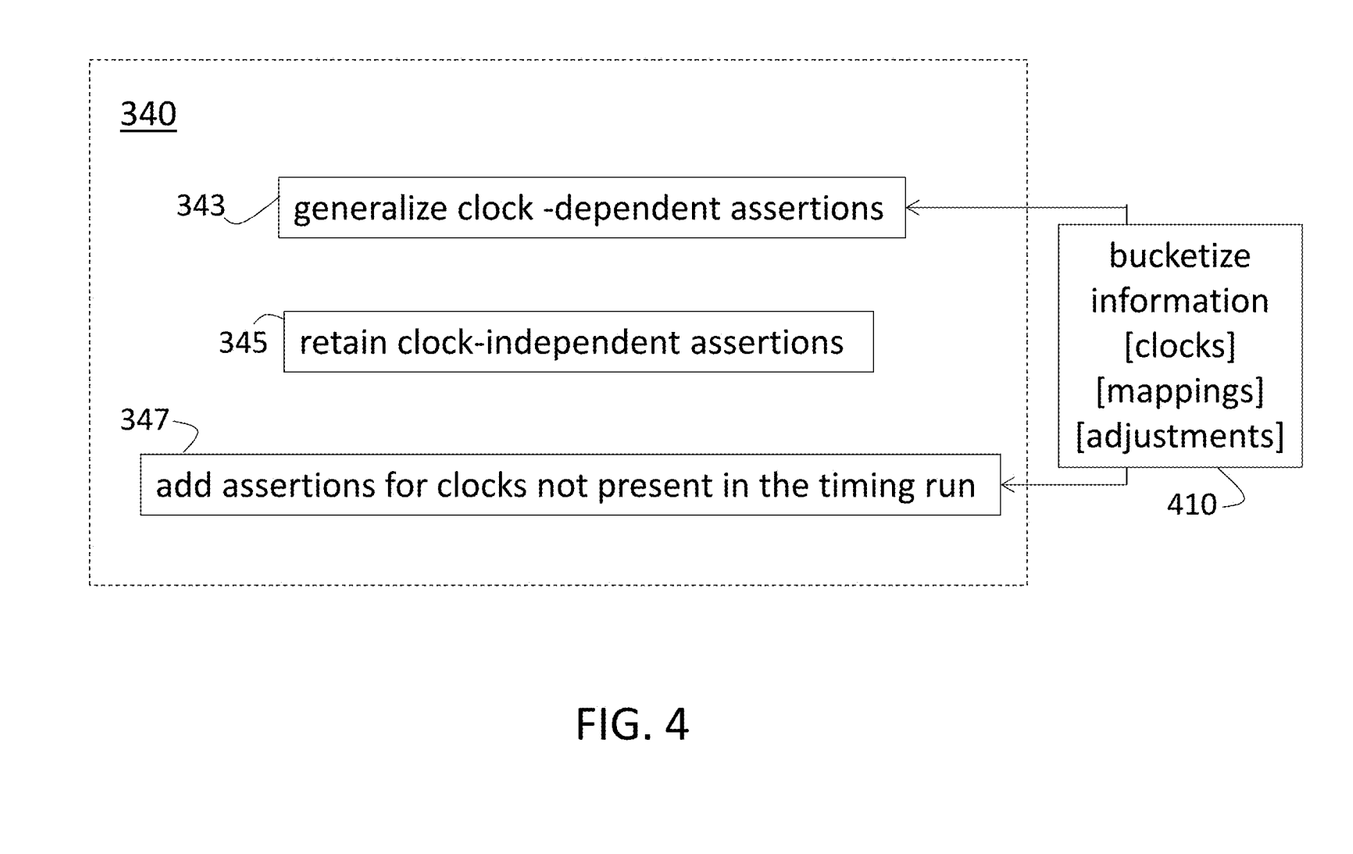
FIG. 4 details the processes involved in generating generalized timing constraints according to one or more embodiments.

FIG. 4 details the processes involved in generating generalized timing constraints (at block 340) according to one or more embodiments. At block 410, bucketizing information is performed once for every macro 125 of the chip 120. The bucketizing or binning refers to grouping every clock of every domain type used on the chip 120 (e.g., functional clocks, scan clocks, array clocks, gated high clocks, out-of-phase clocks, Don't Care (DC) clocks (untimed signals), input-output (TO) clocks, test clocks). Bucketizing also refers to grouping clock mappings (e.g., divided clocks, functional to scan, functional to array-read, functional to array-write, functional to built-in self-test (BIST)) and grouping clock adjustments (e.g., n cycle, nxFO4, half cycle, 10 picosecond adjusts, 5 picosecond adjusts). Clock mappings and clock adjustments are related to timing constraints. As noted previously, timing constraints are defined at certain nodes 210 and specify adjustments or delays to the timing signal. Specifically, clock adjustments refer to delaying or providing timing margins at certain nodes 210 to account for inaccuracies in modeling or pessimism or optimism in the timing tool. The adjustment may be a function of cycle time (which can change based on clock domains), a multiplier of fanout of 4 delay metric (FO4), where FO4 values change based on process, voltage, and temperature and differ from chip 120 to chip 120. Representing the delay as a function of FO4, rather than as a hardcoded value, enables generalization and reuse. The clock adjustments in the clock domain-dependent timing abstract will be hardcoded values when the timing abstract is generated (at block 330), and they are converted according to bucketized values (e.g., n times function of cycle time, FO4 number) at blocks 343 and 347 to generate generalized timing constraints (at block 340).

While the bucketizing process at block 410 is completed once and used for every macro 125 of the chip 120, the processes 343, 345, 347 associated with generalizing timing constraints (at block 340) are performed for each macro 125. At block 343, generalizing clock-dependent constraints includes using the bucketized information (at block 410). The constraints (obtained at block 330) that result from the clock used to perform the detailed timing analysis (at block 310) are grouped according to the bucketized information (at block 410). Clock dependent constraints may be broadly classified as rename constraints, clone constraints, kill constraints, and adjust constraints. Rename constraints involve converting one clock to another clock (mapping). Appropriate clock domains for conversion are identified, and the constraint is rephrased as "rename the clock at this clock domain to its equivalent mapped clock at the other clock domain" (using the information in the clock bucket and the clock mapping bucket at block 410).

Similarly, clone constraints involve creating a new clock along with the existing clock (for multiple-clock timing analysis). Appropriate clock domains are identified, and the constraint is rephrased as "clone the clock at this clock domain to its equivalent mapped clock at the other clock domain" (using the information in the clock bucket and the clock mapping bucket at block 410). Killing constraints involve preventing certain clocks from propagating to certain regions of the macro 125. The appropriate clock domains of these clocks are identified and the constraint is rephrased as "kill any clock in this clock domain from propagating forward." Adjust constraints involve providing timing margins at certain nodes to account for inaccuracies in modeling or pessimism or optimism in the timing tool. The adjust value is converted as a function of cycle time or FO4 number and the constraint is rephrased as "adjust the signal arrival time at this point with n times clock cycle time at the point or n times FO4 for the chip" (using information in the adjust bucket at block 410).

The processes involved in generalizing timing constraints (at block 340) also include retaining clock-independent constraints, at block 345. Clock independent constraints involve constraints that are path specific (like false path constraints, where the particular path need not be timed irrespective of the signal arriving there), global constraints (which affect the netlist globally for any scenario), and netlist specific constraints (e.g., loop snipping constraints). Adding constraints for clocks that are not present in the timing run (at block 310) also uses the bucketized information (at block 310). This process involves adding groupings for other clocks—other than the clock used in the processing at block 310—that may be encountered by the macro 125 based on its placement in a different area of the chip 120. As shown in FIG. 3, these processes (at blocks 343, 345, 347 discussed with reference to FIG. 4) result in generalized timing constraints of internal nodes of the macro 125. As discussed with reference to FIG. 5, this clock domain-independent timing abstract 205 obtained at block 350 may be used in a particular context (for a particular clock domain) within the chip 120 design by translating the constraints to the particular context.

Figure 5:
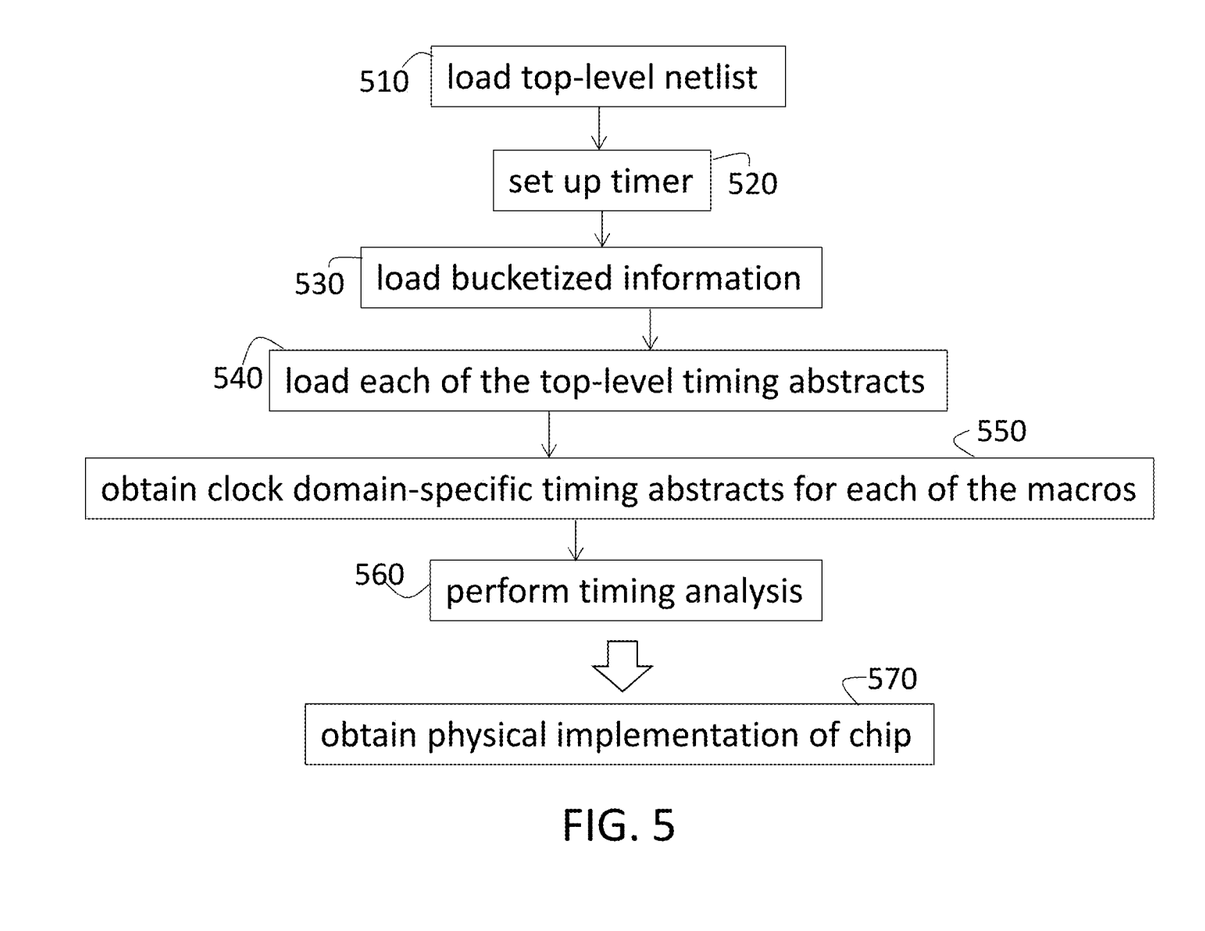
FIG. 5 is a process flow of a method of performing timing analysis using clock domain-independent timing abstracts according to one or more embodiments of the invention.

FIG. 5 is a process flow of a method of performing timing analysis using clock domain-independent timing abstracts according to one or more embodiments of the invention. The exemplary processes shown in FIG. 5 pertain to performing timing analysis of a unit 123 that includes multiple macros 125. As previously noted, the hierarchical terminology is not fixed but is, instead, a general breakdown of the components of the chip 120. Thus, for example, a unit 123 may itself be considered as a macro 125, in which case the processes shown in FIG. 5 may pertain to a core 121. Additionally, while a clock domain-independent timing abstract 205 used in timing analysis is specifically discussed, the clock domain-independent abstract may instead be used for power or noise analysis, for example. According to the exemplary embodiment, loading the top-level netlist, at block 510, includes loading the unit-level netlist, which includes specifying the connectivity among macros 125 that make up the unit 123. At block 520, the processes include setting up a timer to perform timing during the timing analysis run. Like loading the top-level netlist (at block 510), the process of setting up the timer is a well-known part of performing timing analysis. Loading the bucketized information, at block 530, facilitates instantiating clock domain-dependent constraints for the clock domain-independent abstracts 205 generated as discussed above.

At block 540, loading each of the top-level timing abstracts includes loading constraints of the netlist or constraints associated with the connectivity among the macros 125 of the unit 123 according to the exemplary embodiment. Although top-level abstracts (e.g., unit-level or higher) are less likely to be reused in different parts of the chip 120 than lower-level abstracts (e.g., macro-level), the top-level abstracts may be made clock domain-independent according to the embodiments detailed herein, as well. Obtaining clock domain-specific timing abstracts 205 for each of the macros 125, at block 550, involves processes detailed with reference to FIG. 6 that are performed on the clock domain-independent timing abstracts 205 obtained as discussed above. Performing timing analysis, at block 560, is well-known once the clock-domain specific timing abstracts are obtained from the clock domain-independent timing abstracts 205 (at block 550). Performing timing analysis may include writing out timing violation reports to specify which portions of the unit 123 fail to meet timing requirements of the design. This facilitates incremental improvement of the placement of components on the chip 120. As noted previously, obtaining a physical implementation of the chip 120, at block 570, which meets all the timing requirements is the ultimate goal of the processes discussed herein.

Figure 6:
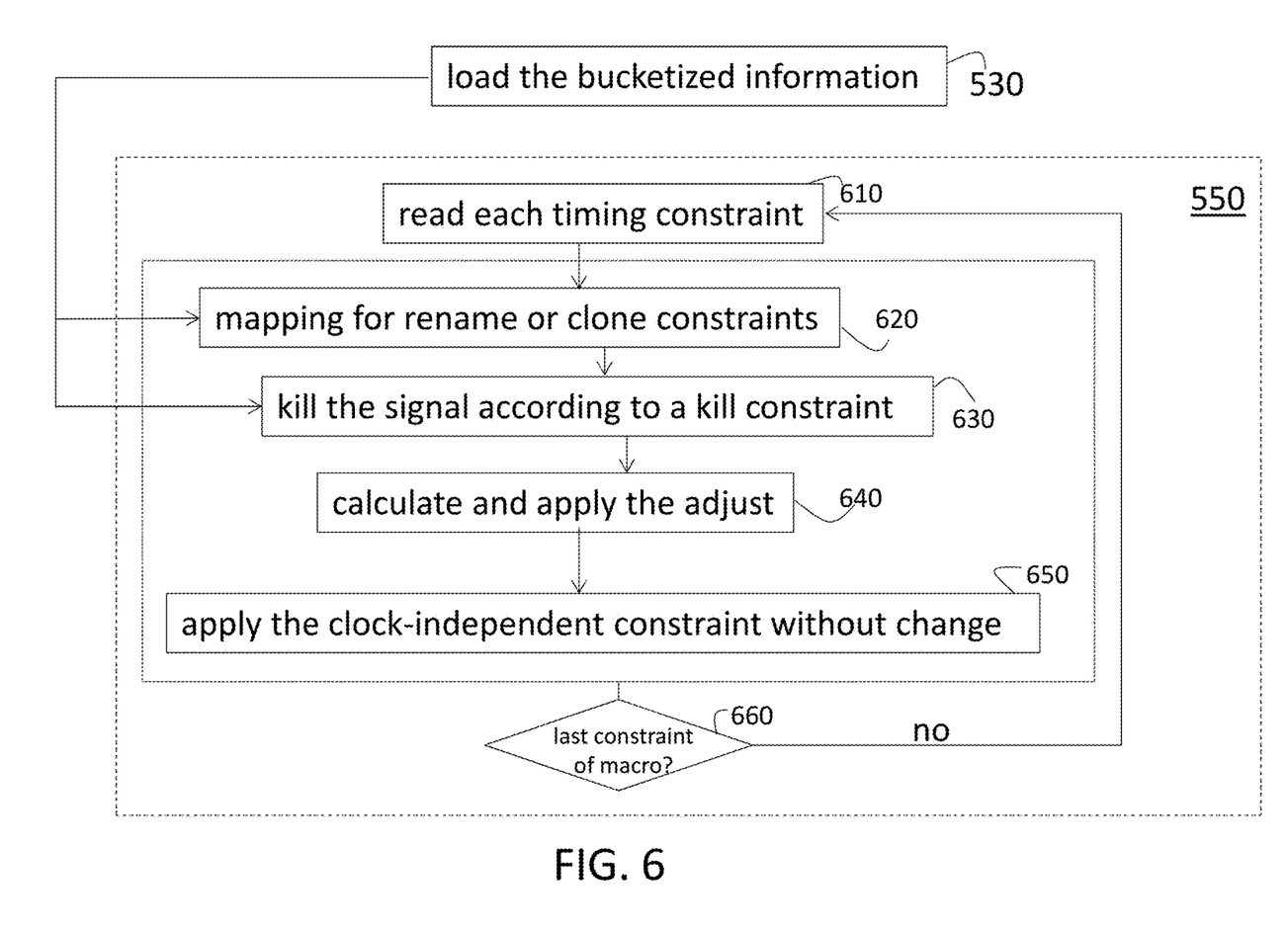
FIG. 6 is a process flow of obtaining a clock domain-specific timing abstract from a clock domain-independent timing abstract according to one or more embodiments of the invention.

FIG. 6 is a process flow of obtaining a clock domain-specific timing abstract (at block 550) from a clock domain-independent timing abstract according to one or more embodiments of the invention. The processes shown in FIG. 6 are executed for each macro 125 (and each instance of the same macro 125) in the unit 123 whose timing analysis is performed. Bucketized information (at block 410) that is loaded at block 530 is used. Reading each timing constraint of the clock domain-independent timing abstract 205, at block 510, includes reading all the constraints processed according to blocks 343, 345, and 347 for the given macro 125, in turn. Processes 620, 630, and 640 pertain to specifying (according to the current clock domain) the clock-domain dependent constraints that were generalized (at block 343) when the constraint (read at block 610) is a constraint that was generalized (at block 343). When the constraint read at block 610 is a rename or clone constraint, mapping for a renaming or cloning constraint, at block 620, includes mapping the arriving timing signal at the node associated with the constraint based on the bucketized mapping information loaded at block 530. That is, if the constraint that was read (at block 610) for the clock domain-independent timing abstract 205 is a rename constraint or a clone constraint, the new mapped signal for the timing signal arriving at the node 210 is determined using the global clock mapping data (at block 410), and the signal at the node 210 is renamed or cloned to its equivalent mapped signal.

When the constraint read at block 610 is a kill constraint, killing the signal according to the kill constraint (also known as a "don't care"), at block 630, includes determining the clock domain information of the timing signal associated with the constraint from the global clock bucket (generated at block 410 and loaded at block 530). If the arriving timing signal matches with the timing signal specified by the clock domain constraint, then the signal is killed and prevented from propagating forward during the timing analysis. When the constraint read at block 610 is an adjustment of the signal, calculating and applying the adjust, at block 640, refers to calculating the adjust value (generalized at block 343 according to information from block 410) and applying it at the node associated with the adjust constraint. When the constraint read at block 610 is not a clock domain-dependent constraint, the processes include applying the clock-independent constraint without change, at block 650. As FIG. 6 indicates, the processes 610 through 650 are performed for a given macro 125 until every constraint of the macro 125 has been processed, according to a check at block 660.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment of the invention had been described, it will be understood that those skilled in the art, both now and in the future, may make various improvements and enhancements which fall within the scope of the claims which follow. These claims should be construed to maintain the proper protection for the invention first described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of generating a clock domain-independent abstract of a component in an integrated circuit design, the method comprising:
   performing an initial analysis of the component using an initial clock value for each clock domain type, the clock domain types including a functional clock and a test clock;
   executing an abstractor to obtain a reduced order model of the initial analysis as a clock domain-dependent abstract;
   obtaining original constraints associated with one or more circuit elements within the component from the clock domain-dependent abstract;
   generating generalized constraints based on clock domain-dependent constraints among the original constraints;
   generating the clock domain-independent abstract based on the generalized constraints, wherein the clock domain-independent abstract is generic to every clock domain type;
   performing one or more analyses using the clock domain-independent abstract, wherein the one or more analyses includes a timing analysis; and
   providing the integrated circuit design for physical implementation based on the one or more analyses using the clock domain-independent abstract.

2. The method according to claim 1, wherein the performing the initial analysis includes performing timing analysis, the performing the timing analysis including generating a timing graph representing the component, the timing graph including nodes within the component connected by timing arcs, and the obtaining the original constraints includes obtaining original timing constraints indicating adjustments or delays to timing signals propagated during the timing analysis at the one or more circuit elements.

3. The method according to claim 2, further comprising bucketizing all the clock domain types, all clock mappings, and all clock adjustments associated with every constraint in the timing analysis of the integrated circuit design to generate respective clock buckets, clock mapping buckets, and clock adjustment buckets, the clock buckets including a functional clock bucket and a test clock bucket.

4. The method according to claim 3, wherein the generating the generalized timing constraints includes generalizing the clock-dependent constraints using the clock buckets, the clock mapping buckets, or the clock adjustment buckets, and retaining clock-independent constraints among the original timing constraints.

5. The method according to claim 3, wherein the generating the generalized timing constraints includes adding constraints, in a form of the clock buckets, the clock mapping buckets, or the clock adjustment buckets, for clock values other than the initial clock values used to obtain the original timing constraints.

6. The method according to claim 3, further comprising generating a clock domain-specific timing abstract from the clock domain-independent timing abstract to perform subsequent timing analysis.

7. The method according to claim 6, wherein the generating the clock domain-specific timing abstract includes reading each of the generalized timing constraints and obtaining a specific timing constraint based on using information in the clock buckets, the clock mapping buckets, or the clock adjustment buckets.

8. A system to generate a clock domain-independent abstract of a component in an integrated circuit design, the system comprising:
a memory device configured to store a reduced order model of an initial analysis of the component that was performed using an initial clock value for each clock domain type, the reduced order model being a clock domain-dependent abstract and the clock domain types including a functional clock and a test clock; and
a processor configured to obtain original constraints associated with one or more circuit elements within the component from the clock domain-dependent abstract, generate generalized constraints based on clock domain-dependent constraints among the original constraints, generate the clock domain-independent abstract based on the generalized constraints, wherein the clock domain-independent abstract is generic to every one of the clock domain types, and perform one or more analyses using the clock domain-independent abstract, wherein the one or more analyses includes a timing analysis and the integrated circuit design is provided for physical implantation based on the one or more analyses using the clock domain-independent abstract.

9. The system according to claim 8, wherein the processor performs timing analysis of the component by generating a timing graph representing the component, the timing graph including nodes within the component connected by timing arcs, obtains timing constraints associated with one or more of the nodes within the component as the original constraints, the nodes indicating points at which timing is analyzed during the timing analysis and the timing constraints indicating adjustments or delays to timing signals propagated during the timing analysis at the one or more of the nodes, and the memory device additionally stores clock buckets, clock mapping buckets, and clock adjustment buckets resulting based on the processor respectively bucketizing all clock domain types, all clock mappings, and all clock adjustments associated with every constraint in the timing analysis of the integrated circuit design.

10. The system according to claim 9, wherein the processor generates the generalized timing constraints by generalizing clock-dependent constraints used in performing the timing analysis for the initial clock using the clock buckets, the clock mapping buckets, or the clock adjustment buckets and retaining clock-independent constraints used in performing the timing analysis for the initial clock.

11. The system according to claim 10, wherein the processor generates the generalized timing constraints by adding constraints, in a form of the clock buckets, the clock mapping buckets, or the clock adjustment buckets, for clocks other than the initial clock.

12. The system according to claim 10, wherein the processor generates a clock domain-specific timing abstract from the clock domain-independent timing abstract to perform timing analysis.

13. The system according to claim 12, wherein the processor generates the clock domain-specific timing abstract by reading each of the generalized timing constraints and obtaining a specific timing constraint based on using information in the clock buckets, the clock mapping buckets, or the clock adjustment buckets.

14. A computer program product for generating a clock domain-independent abstract of a component in an integrated circuit design, the computer program product comprising a computer readable storage medium having program instructions embodied therewith, the program instructions executable by a processor to perform a method comprising:
performing an initial analysis of the component using an initial clock value for each clock domain type, the clock domain types including a functional clock and a test clock;
executing an abstractor to obtain a reduced order model of the initial analysis as a clock domain-dependent abstract;
obtaining original constraints associated with one or more circuit elements within the component from the clock domain-dependent abstract;
generating generalized constraints based on clock domain-dependent constraints among the original constraints;
generating the clock domain-independent abstract based on the generalized constraints, wherein the clock domain-independent abstract is generic to every clock domain type;
performing one or more analyses using the clock domain-independent abstract, wherein the one or more analyses includes a timing analysis; and
providing the integrated circuit design for physical implementation based on the one or more analyses using the clock domain-independent abstract.

15. The computer program product according to claim 14, wherein the performing the initial analysis includes performing timing analysis, the performing the timing analysis including generating a timing graph representing the component, the timing graph including nodes within the component connected by timing arcs, and the obtaining the original constraints includes obtaining original timing constraints indicating adjustments or delays to timing signals propagated during the timing analysis at the one or more circuit elements.

16. The computer program product according to claim 15, further comprising bucketizing all clocks, all clock mappings, and all clock adjustments associated with every constraint in the timing analysis of the integrated circuit design to generate respective clock buckets, clock mapping buckets, and clock adjustment buckets.

17. The computer program product according to claim 16, wherein the generating the generalized timing constraints includes generalizing clock-dependent constraints used in the performing the timing analysis for the initial clock using the clock buckets, the clock mapping buckets, or the clock adjustment buckets and retaining clock-independent constraints used in the performing the timing analysis for the initial clock.

18. The computer program product according to claim 15, wherein the generating the generalized timing constraints includes adding constraints, in a form of the clock buckets, the clock mapping buckets, or the clock adjustment buckets, for clocks other than the initial clock.

19. The computer program product according to claim 15, further comprising generating a clock domain-specific timing abstract from the clock domain-independent timing abstract to perform timing analysis.

20. The computer program product according to claim 19, wherein the generating the clock domain-specific timing abstract includes reading each of the generalized timing constraints and obtaining a specific timing constraint based on using information in the clock buckets, the clock mapping buckets, or the clock adjustment buckets.

* * * * *